United States Patent
Lee et al.

(10) Patent No.: US 7,344,158 B2
(45) Date of Patent: Mar. 18, 2008

(54) MOUNTING STRUCTURE OF STEERING COLUMN FOR VEHICLES

(75) Inventors: Jong Bum Lee, Gunpo (KR); Ki Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 318 days.

(21) Appl. No.: 10/941,269

(22) Filed: Sep. 15, 2004

(65) Prior Publication Data

US 2005/0093285 A1  May 5, 2005

(30) Foreign Application Priority Data

Nov. 3, 2003  (KR) ............... 10-2003-0077293

(51) Int. Cl.
*B62D 1/16* (2006.01)
(52) U.S. Cl. .................. 280/779; 280/777
(58) Field of Classification Search ............. 280/777, 280/779, 780; 74/492
See application file for complete search history.

(56) References Cited

U.S. PATENT DOCUMENTS 4,738,469 A * 4/1988 Ushijima et al. ........... 280/777

6,336,376 B1 * 1/2002 Lee .............................. 74/512
7,086,665 B2 * 8/2006 Lee ............................ 280/779

FOREIGN PATENT DOCUMENTS

JP    2002-362339    12/2002

* cited by examiner

*Primary Examiner*—Eric Culbreth
(74) *Attorney, Agent, or Firm*—Morgan Lewis & Bockius LLP

(57) ABSTRACT

A mounting structure of a steering column for a vehicle is provided with a column mounting bracket coupling the steering column to a cowl cross-member. A pedal bracket is coupled to a dash panel of the vehicle and a contact prevention part is provided at the column mounting bracket so that contact between an inner end of the pedal bracket and the column mounting bracket is minimized. Therefore, injuries to a driver and noise from vibration are minimized along with an increase in workability in manufacturing and assembly of the pedal structure.

4 Claims, 4 Drawing Sheets

MOUNTING STRUCTURE OF STEERING COLUMN FOR VEHICLES

CROSS REFERENCE TO RELATED APPLICATIONS

This application claims priority of Korean Application No. 10-2003-0077293, filed Nov. 3, 2003, the disclosure of which is incorporated herein by reference.

TECHNICAL FIELD OF THE INVENTION

The present invention generally relates to a mounting structure of a steering column for a vehicle. More specifically, the mounting structure of the steering column is provided that minimizes a driver's ankle or leg injury from a brake pedal during a collision and/or rear-end collision accident.

BACKGROUND OF THE INVENTION

Typically, a steering column is fixed to a cowl cross-member by a column mounting bracket. Various pedals are installed near a dash panel by a pedal bracket. The pedals are configured to be manipulated by the driver for functions such as acceleration, braking, and clutch operation. The dash panel may be pushed into the occupant compartment of the vehicle by a collision or a rear-end collision accident so that the pedal bracket impacts with the column mounting bracket.

If a dash panel is pushed toward inside of the car room during an accident and a pedal bracket impacts with a column mounting bracket so as to suppress pushing of the pedal bracket, the pedal that is pivotally attached to the pedal bracket may suddenly rotate toward a driver and act as an element to injure the driver.

SUMMARY OF THE INVENTION

According to a preferred embodiment, a mounting structure of a steering column is provided that minimizes injury to a driver from a pedal mounted on a pedal bracket. Movement of the pedal bracket and dash panel in the direction of the inside of the car is minimized during a collision or a rear-end collision accident with a column mounting bracket for fixing a steering column.

The mounting structure of the steering column for a vehicle includes a steering column, a column mounting bracket that attaches the steering column to a cowl cross-member, and a pedal bracket attached to a dash panel. Furthermore, a contact prevention part is provided at the column mounting bracket so that contact between the inner end of the pedal bracket and the column mounting bracket may be prevented.

Accordingly, the present invention minimizes movement of a pedal bracket during a collision or rear-end collision accident. The pedal bracket is refrained from making contact with a column mounting bracket and thus minimizing injury to a driver, due to sudden movement of the pedal, including ankle spraining or shin injury. Moreover, effects of vibration and noise are minimized with the structure of the present invention as well as simplicity in assembly and workability.

BRIEF DESCRIPTION OF THE DRAWINGS

For better understanding of the nature and objects of the invention, reference should be made to the following detailed description, taken in conjunction with the accompanying drawings, in which.

DETAILED DESCRIPTION OF PREFERRED EMBODIMENTS

Figure 1:
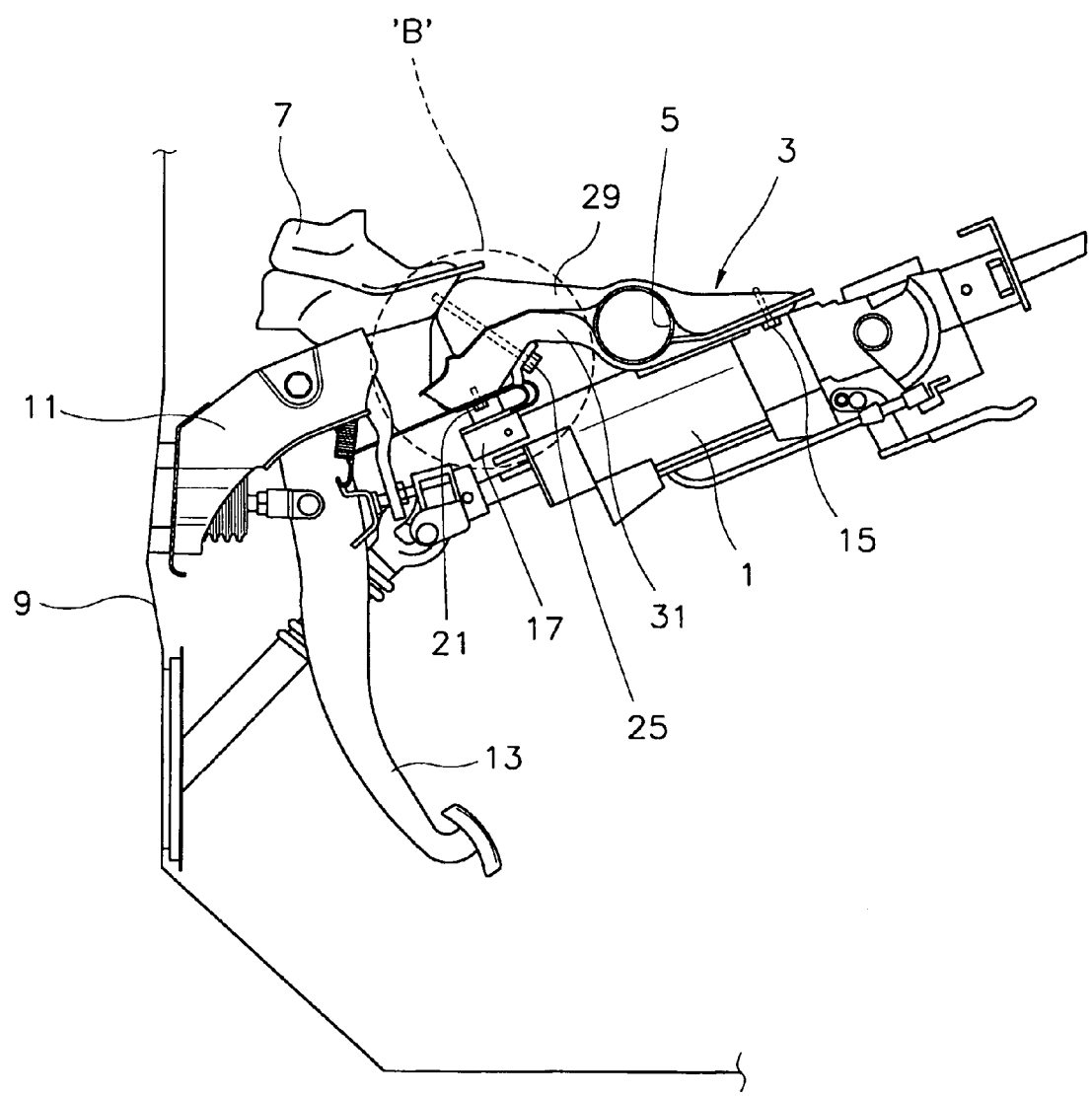
FIG. 1 is a side view illustrating a mounting structure of a steering column according to an embodiment of the present invention.

Referring to FIG. 1, a steering column 1 is attached to a cowl cross-member 5 and a column mounting extension 7 by a column mounting bracket 3. A pedal 13 is pivotally attached to a dash panel 9 through a pedal bracket 11. The column mounting extension 7 is firmly attached to a cowl of a car body and enables the column mounting bracket 3 to be attached to the car body firmly.

Figure 3:
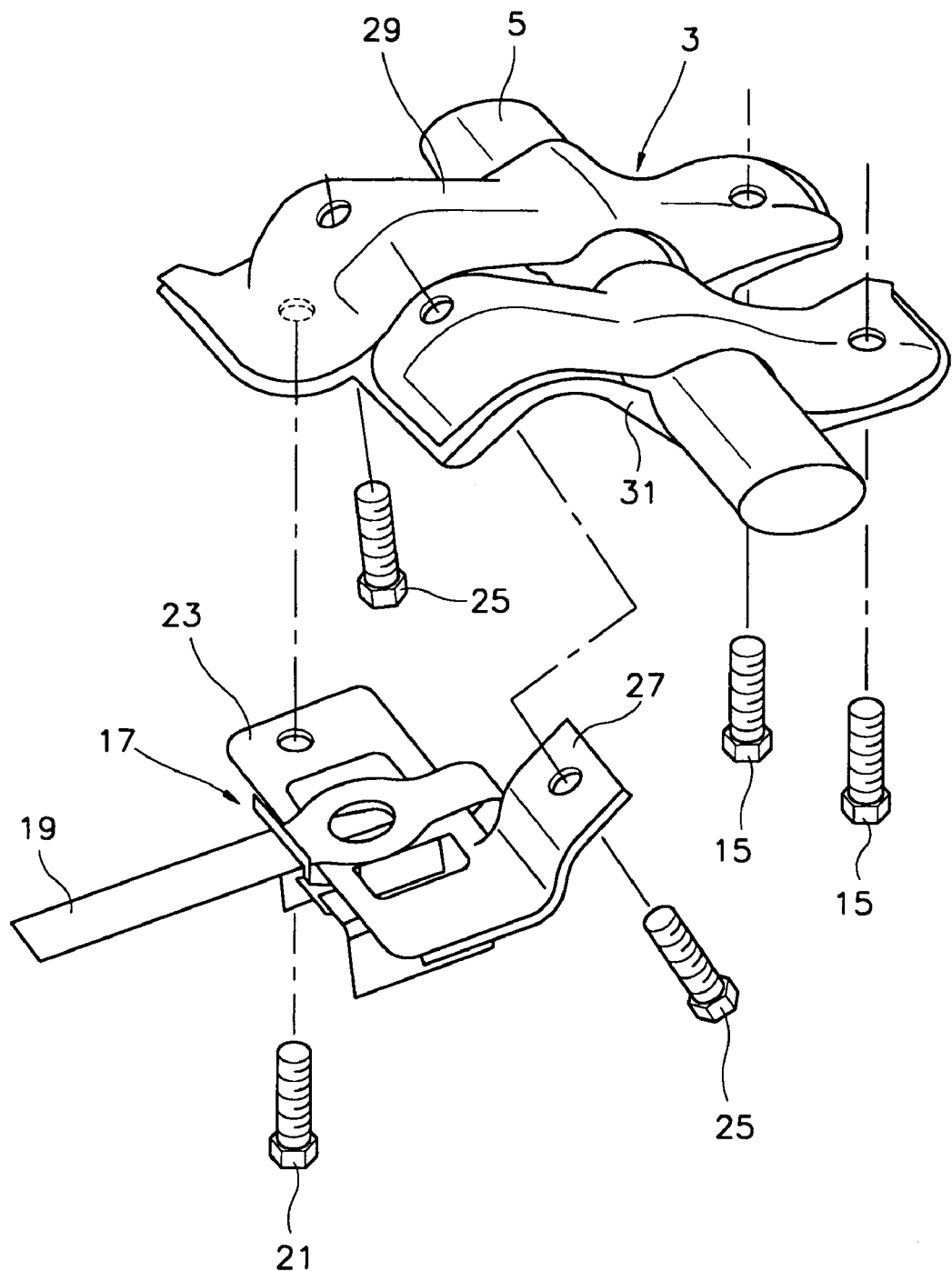
FIG. 3 is a perspective view illustrating coupling of a column bracket and a lower bracket according to an embodiment of the present invention.
Figure 4:
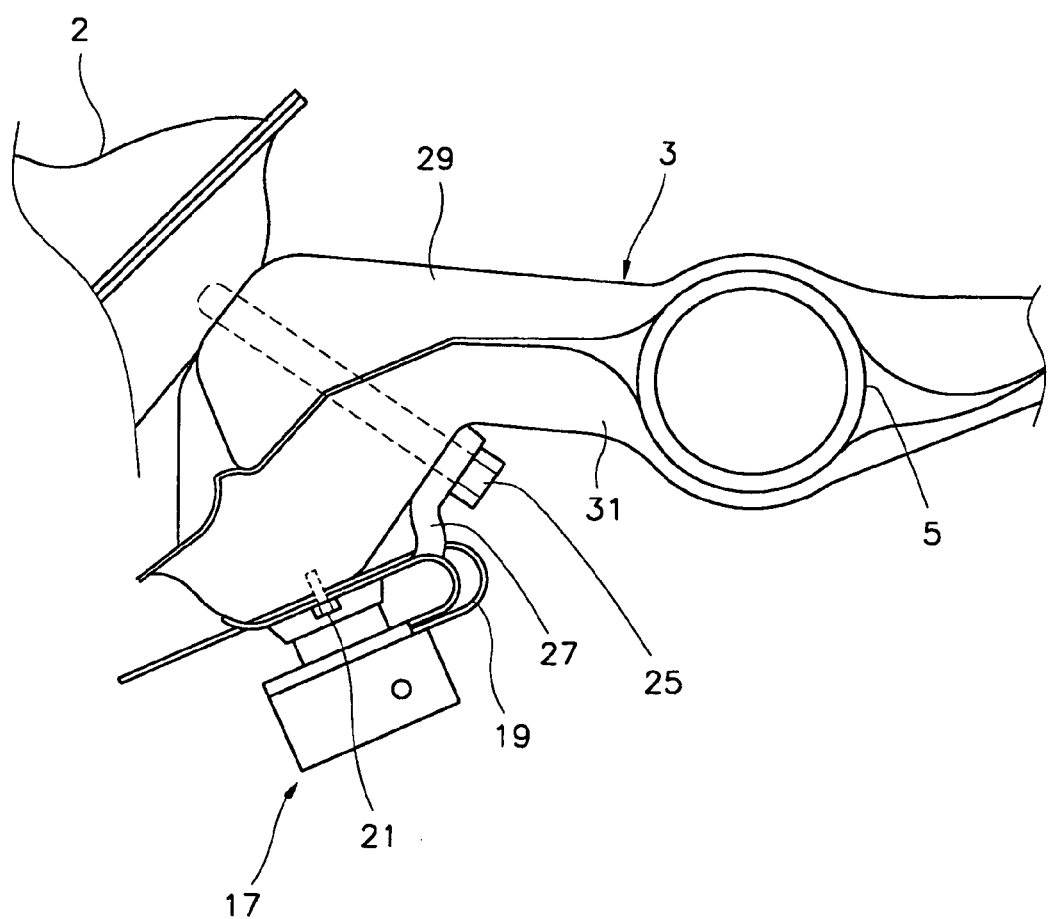
FIG. 4 is an enlarged view of part B of FIG. 1.

One side of the steering column 1, in a longitudinal direction, is fixed to the column mounting bracket 3 by a first bolt 15, while the other side is attached to the column mounting bracket 3 through a lower bracket 17. As illustrated in FIGS. 1 and 3, the lower side of the steering column 1 is supported with the column mounting bracket 3 through the lower bracket 17 and the lower bracket 17, in its installation with steering column 1 is made in a sliding structure so that potential impact on a driver by contacting the steering wheel may be absorbed during a collision accident and that sliding may be suppressed by a capsule under normal conditions.

Preferably, a strap 19 is also attached to the lower bracket so that the steering column 1 may undergo deformation and absorb energy when it slides against the lower bracket 17.

According to a further embodiment, as shown in FIG. 3, the lower bracket 17, attached with the column mounting bracket 3 includes a first flange part 23 that overlaps with a lower surface of a left front side of the column mounting bracket 3 and is penetrated by a third bolt 21. A second flange part 27 extends from the first flange part 23 toward the rear of the vehicle. The second flange part 27 is overlapped with a lower surface of a right middle side of the column mounting bracket 3 and penetrated by a second bolt 25.

The column mounting bracket 3 includes a column mounting upper plate 29 and a column mounting lower plate 31. The plates 29 and 31 are overlapped with a space part being formed there-between. A cowl cross-member 5 is installed along the width direction of the car body between the column mounting upper plate 29 and column mounting lower plate 31.

Figure 2:
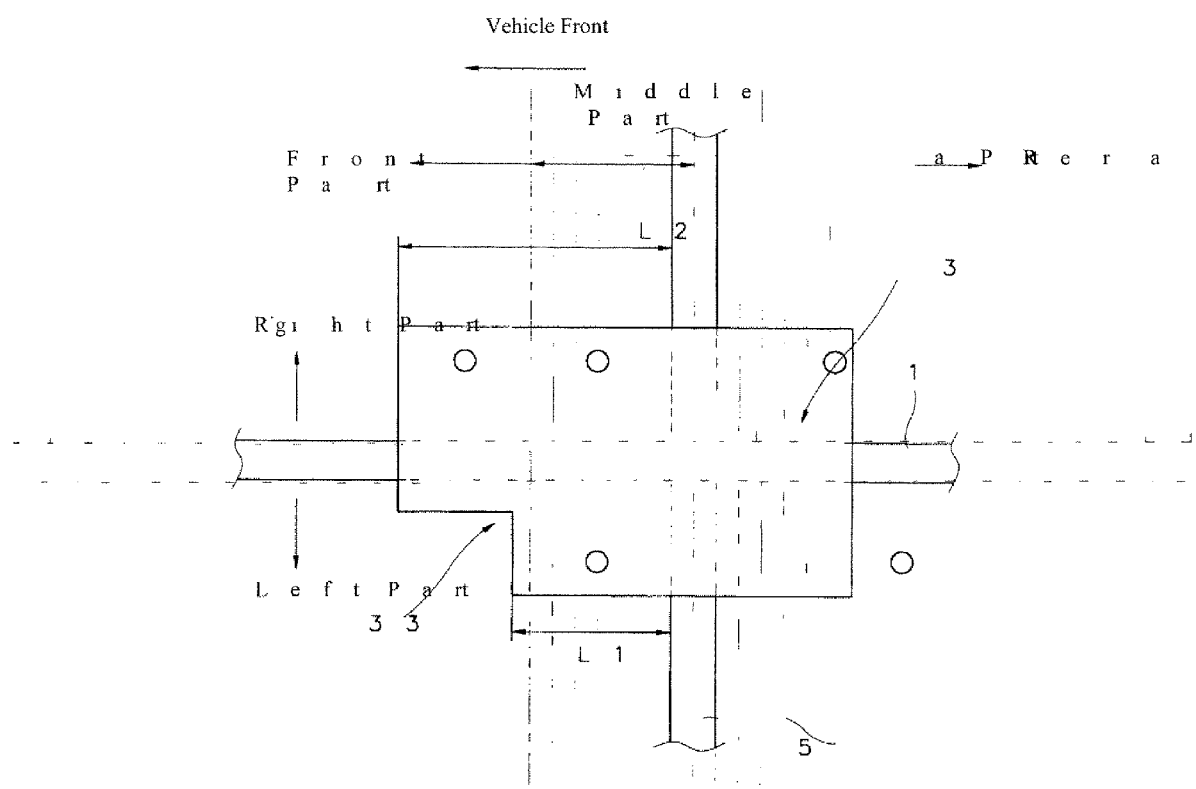
FIG. 2 is a schematic top view of a column mounting bracket according to an embodiment of the present invention.

A contact prevention part 33 is provided in the column mounting bracket 3 that minimizes contact of the inner end of a pedal bracket 11 with the column mounting bracket 3 during a collision or a rear-end collision accident of a vehicle. Referring to FIG. 2, the contact prevention part 33 is of a structure in which a portion facing the inner end of the pedal bracket 11 in the front part of the column mounting bracket 3 is formed in a concave shape toward the rear of the vehicle as compared with other portions. In other words, a void space is provided so that mounting bracket 3 does not contact the pedal 13 when moved forward in a collision. Therefore, the distance from a cowl cross-member 5 to the right middle part of a column mounting bracket 3 is L1 at the portion that faces the inner end of the pedal bracket 11. L1 is shorter than the distance L2 from a cowl cross-member 5 to where the left front part makes contacts with the pedal bracket 11.

The column mounting bracket 3 includes a plurality of fastening parts generally located at the rear and middle parts thereof. The column mounting bracket 3 is fastened with the first bolts 15 and second bolts 25 after they respectively pass through the column mounting lower plate 31 and column mounting upper plate 29. The fastening part located at the front of the column mounting bracket 3 is fastened with a third bolt 21 after it passes through the column mounting lower plate 31.

The left middle part of the column mounting bracket 3 is overlapped with the bottom of the column mounting extension 7 and fixed at the column mounting extension 7 by a second bolt 25. The second bolt 25 passes through the column mounting lower plate 31 and column mounting upper plate 29 and is fastened at the column mounting extension 7.

To compensate for the void created by prevention means 33, second flange part 27 extends back to provide additional support. The right middle part of the column mounting bracket 3 is overlapped between the bottom of the column mounting extension 7 and the top of the second flange part 27 and is attached at the column mounting extension 7 by the second bolt 25. The second bolt 25 passes through the second flange part 27 and the column mounting lower plate 31 and column mounting upper plate 29 and is fastened at the column mounting extension 7.

Additionally, the left front part of the column mounting bracket 3 is of the structure, wherein, it is attached with the third bolt 21 with its bottom surface being overlapped with the first flange part 23 of the lower bracket 17. The rear part of the column mounting bracket 3 is attached with a steering column 1 by first bolts 15 after passing through the column mounting lower plate 31 and column mounting upper plate 29. If the dash panel 9 is pushed into a car room by a collision or rear-end collision accident, the pedal bracket 11 attached at the dash panel 9 is also pushed into a car room.

The contact prevention part 33 of the column mounting bracket 3 formed in the pathway where the pedal bracket 11 is pushed and shifted keeps the pedal bracket 11 from contacting with the column mounting bracket 3 so that the pedal 13 mounted at the pedal bracket 11 may not suddenly rotate toward a driver. Furthermore, the structure of firm contacting and fixation between the lower bracket 17 and column mounting bracket 3 is configured relatively easily while a contact prevention part 33 is provided so as to enable movement of a pedal bracket 11. As a result, vibration and noise is minimized by fixation part of the steering column 1. Also, simplicity of workability and fixation of the steering column 1 can also be facilitated.

What is claimed is:

1. A mounting structure for a steering column of a vehicle, comprising:
    a column mounting bracket for fixing an upper part of said steering column to a cowl cross-member;
    a lower bracket for fixing a lower part of said steering column to said column mounting bracket;
    a pedal bracket coupled to a dash panel; and
    contact prevention means disposed on said column mounting bracket so that contact between an inner end of said pedal bracket and said column mounting bracket is minimized in an event of rearward movement in a collision,
    wherein said contact prevention means has a portion facing said inner end of said pedal bracket in a right front part of said column mounting bracket and formed in a concave shape toward a rear of said vehicle relative to other portions of said mounting bracket;
    wherein said column mounting bracket comprises:
        a column mounting upper plate and a column mounting lower plate that are overlapped with a space part being formed there-between, wherein said cowl cross-member is installed along a width direction of a car body between said column mounting upper plate and said column mounting lower plate;
        a rear part and a middle part being fastened with at least a first bolt and at least a second bolt after said first and second bolts respectively pass through said column mounting lower plate and said column mounting upper plate together; and
        a front part fastened with at least a third bolt after said third bolt passes through said column mounting lower plate.

2. The mounting structure according to claim 1, wherein said mounting structure further comprises:
    a column mounting extension that attaches said column mounting bracket to said vehicle, wherein said lower bracket is located between a front part of said column mounting bracket and said steering column to attach said steering column to said column mounting bracket.

3. The mounting structure according to claim 2, wherein said lower bracket comprises:
    a first flange part being overlapped with a lower surface of a left front part of said column mounting bracket and penetrated by at least one bolt; and
    a second flange part extending from said first flange part toward said rear of said vehicle, and overlapped with a lower surface of a right middle part of said column mounting bracket and penetrated by at least one additional bolt.

4. The mounting structure according to claim 3,
    wherein a left middle part of said column mounting bracket is overlapped with a bottom of said column mounting extension and attached at said column mounting extension by one of the at least one second bolt that passes through a column mounting lower plate and a column mounting upper plate together and is fastened at said column mounting extension, and
    wherein said right middle part of said column mounting bracket is overlapped between a bottom of said column mounting extension and said second flange part of said lower bracket and fixed at said column mounting extension by another one of the at least one second bolt that passes said second flange part, said column mounting lower plate, and said column mounting upper plate together, and is fastened at said column mounting extension.

* * * * *